United States Patent
Netzer et al.

(10) Patent No.: US 8,413,698 B2
(45) Date of Patent: *Apr. 9, 2013

(54) TIRE FOR HEAVY VEHICLES

(75) Inventors: Gaëlle Netzer, Gerzat (FR); Jean Coue, Romagnat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/988,109

(22) PCT Filed: Jun. 28, 2006

(86) PCT No.: PCT/EP2006/063655
§ 371 (c)(1),
(2), (4) Date: Dec. 31, 2007

(87) PCT Pub. No.: WO2007/003559
PCT Pub. Date: Jan. 11, 2007

(65) Prior Publication Data
US 2009/0038732 A1     Feb. 12, 2009

(30) Foreign Application Priority Data

Jun. 30, 2005  (FR) ..................... 05 06760

(51) Int. Cl.
- *B60C 9/18* (2006.01)
- *B60C 9/22* (2006.01)
- *B60C 9/28* (2006.01)

(52) U.S. Cl. ........ 152/526; 152/531; 152/532; 152/535; 152/538

(58) Field of Classification Search ........................ None
See application file for complete search history.

(56) References Cited

U.S. PATENT DOCUMENTS 3,044,522 A    7/1962 Drakeford et al.
(Continued)

FOREIGN PATENT DOCUMENTS

| EP | 380701 | | 8/1990 |
|---|---|---|---|
| EP | 416893 | * | 3/1991 |
| EP | 0 687 581 | | 12/1995 |
| EP | 849099 | * | 6/1998 |

(Continued)

OTHER PUBLICATIONS

Machine translation of JP 1-132405, 1989.*

*Primary Examiner* — Justin Fischer
(74) *Attorney, Agent, or Firm* — Cozen O'Connor (57) ABSTRACT

A tire having a radial carcass reinforcement comprising a crown reinforcement formed of at least two working crown layers of inextensible reinforcement elements, which are crossed from one ply to the other, forming angles of between 10° and 45° with the circumferential direction, which itself is topped radially by a tread, said tread being joined to two beads by means of two sidewalls and the axially widest working crown layer being radially internal to the other working crown layers. The tire additionally comprises in each shoulder at least one layer of reinforcement elements which are parallel to each other in the layer and are oriented radially relative to the reinforcement elements of the working layer radially adjacent to said additional layer, the axially inner end of said additional layer being radially adjacent to the edge of the radially outer working crown layer, and at least part of said additional layer being radially and/or axially adjacent to the edge of the axially widest working crown layer, the ratio of the elasticity modulus of a layer P to the elasticity modulus of the calendering layer of the working layer adjacent to the additional layer being of between 0.5 and 1, said layer P being arranged between at least part of the working crown layers, the axially outer end of said layer P being axially between the ends of the axially least wide and widest working crown layers.

27 Claims, 6 Drawing Sheets

U.S. PATENT DOCUMENTS

| | | | |
|---|---|---|---|
| 4,183,391 A * | 1/1980 | Romand | 152/458 |
| 4,928,742 A * | 5/1990 | Oku et al. | 152/534 |
| 4,934,428 A * | 6/1990 | Aoki et al. | 152/532 |
| 5,164,028 A * | 11/1992 | Uemura | 152/527 |
| 5,205,881 A | 4/1993 | Kohno et al. | |
| 5,327,713 A * | 7/1994 | Sakon | 57/213 |
| 5,435,369 A | 7/1995 | Yap et al. | |
| 5,662,752 A * | 9/1997 | Nakano | 152/531 |
| 6,315,019 B1 | 11/2001 | Garlaschelli et al. | |
| 6,367,527 B1 | 4/2002 | Cluzel | |
| 6,776,205 B2 | 8/2004 | Pereira et al. | |
| 7,416,006 B2 | 8/2008 | Maurel | |
| 7,500,501 B2 | 3/2009 | Callamand et al. | |
| 2001/0020507 A1 | 9/2001 | Pereira et al. | |

FOREIGN PATENT DOCUMENTS

| | | | |
|---|---|---|---|
| EP | 1 459 910 | | 9/2004 |
| FR | 1207767 | | 2/1960 |
| FR | 2 501 126 | | 9/1982 |
| FR | 2 759 945 | | 8/1998 |
| JP | 59 77906 | | 5/1984 |
| JP | 6067201 | * | 4/1985 |
| JP | 60240506 | * | 11/1985 |
| JP | 63 151504 | | 6/1988 |
| JP | 1-132405 | * | 5/1989 |
| JP | 11 011112 | | 4/1999 |
| WO | WO 2004/076204 | | 9/2004 |
| WO | WO 2004/076205 | | 9/2004 |
| WO | WO 2005/025895 | | 3/2005 |

* cited by examiner

FIG.6

TIRE FOR HEAVY VEHICLES

RELATED APPLICATION

This is a U.S. National Stage of International Application No. PCT/EP2006/063655 filed on Jun. 28, 2006.

This patent application claims the priority of French patent application no. 05/06760 filed Jun. 30, 2005, the disclosure content of which is hereby incorporated by reference.

FIELD OF THE INVENTION

The present invention relates to a tire having a radial carcass reinforcement, and more particularly to a tire intended to be fitted on vehicles bearing heavy loads and traveling at sustained speed, such as, for example, lorries, tractors, trailers or highway buses.

BACKGROUND OF THE INVENTION

The reinforcement armature or reinforcement of tires and in particular of tires of vehicles of the heavy-vehicle type is currently—and most frequently—formed by stacking one or more plies conventionally referred to as "carcass plies", "crown plies", etc. This manner of designating the reinforcement armatures is derived from the manufacturing process, which consists of producing a series of semi-finished products in the form of plies, provided with cord reinforcing threads which are frequently longitudinal, which plies are then assembled or stacked in order to build a tire blank. The plies are produced flat, with large dimensions, and are subsequently cut according to the dimensions of a given product. The plies are also assembled, in a first phase, substantially flat. The blank thus produced is then shaped to adopt the toroidal profile typical of tires. The semi-finished products referred to as "finishing" products are then applied to the blank, to obtain a product ready to be vulcanized.

Such a "conventional" type of process involves, in particular for the phase of manufacture of the blank of the tire, the use of an anchoring element (generally a bead wire), used for anchoring or holding the carcass reinforcement in the zone of the beads of the tire. Thus, in this type of process, a portion of all the plies constituting the carcass reinforcement (or of only a part thereof) is turned up around a bead wire arranged in the bead of the tire. In this manner, the carcass reinforcement is anchored in the bead.

The general adoption of this type of conventional process in the industry, despite the numerous different ways of producing the plies and assemblies, has led the person skilled in the art to use a vocabulary which reflects the process; hence the generally accepted terminology, comprising in particular the terms "plies", "carcass", "bead wire", "shaping", to designate the change from a flat profile to a toroidal profile, etc.

There are nowadays tires which do not, properly speaking, comprise "plies" or "bead wires" in accordance with the preceding definitions. For example, document EP 0 582 196 describes tires manufactured without the aid of semi-finished products in the form of plies. For example, the reinforcement elements of the different reinforcement structures are applied directly to the adjacent layers of rubber mixes, the whole being applied in successive layers to a toroidal core the form of which makes it possible to obtain directly a profile similar to the final profile of the tire being manufactured. Thus, in this case, there are no longer any "semi-finished products", nor "plies", nor "bead wires". The base products, such as the rubber mixes and the reinforcement elements in the form of cords or filaments, are applied directly to the core. As this core is of toroidal form, the blank no longer needs to be shaped in order to change from a flat profile to a profile in the form of a torus.

Furthermore, the tires described in this document do not have the "conventional" upturn of the carcass ply around a bead wire. This type of anchoring is replaced by an arrangement in which circumferential cords are arranged adjacent to said sidewall reinforcement structure, the whole being embedded in an anchoring or bonding rubber mix.

There are also processes for assembly on a toroidal core using semi-finished products specially adapted for quick, effective and simple laying on a central core. Finally, it is also possible to use a mixture comprising at the same time certain semi-finished products to produce certain architectural aspects (such as plies, bead wires, etc.), whereas others are produced from the direct application of mixes and/or reinforcement elements.

In the present document, in order to take into account recent technological developments both in the field of manufacture and in the design of products, the conventional terms such as "plies", "bead wires" etc. are advantageously replaced by neutral terms or terms which are independent of the type of process used. Thus, the term "carcass-type reinforcing thread" or "sidewall reinforcing thread" is valid as a designation for the reinforcement elements of a carcass ply in the conventional process, and the corresponding reinforcement elements, generally applied at the level of the sidewalls, of a tire produced using a process without semi-finished products. The term "anchoring zone", for its part, may equally well designate the "traditional" upturn of a carcass ply around a bead wire of a conventional process and the assembly formed by the circumferential reinforcement elements, the rubber mix and the adjacent sidewall reinforcement portions of a bottom zone produced with a process using application on a toroidal core.

Generally in tires of the heavy-vehicle type, the carcass reinforcement is anchored on either side in the zone of the bead and is radially surmounted by a crown reinforcement formed of at least two layers which are superposed and formed of cords or cables which are parallel in each layer. It may also comprise a layer of metal wires or cables of low extensibility which form an angle of between 45° and 90° with the circumferential direction, this ply, referred to as a triangulation ply, being radially located between the carcass reinforcement and the first, so-called working, crown ply, which are formed of parallel cords or cables having angles at most equal to 45° in absolute value. The triangulation ply forms with at least said working ply a triangulated reinforcement, which undergoes little deformation under the different stresses to which it is subjected, the essential role of the triangulation ply being to absorb the transverse compressive forces to which all the reinforcement elements in the zone of the crown of the tire are subject.

The crown reinforcement comprises at least one working layer; when said crown reinforcement comprises at least two working layers, these are formed of inextensible metallic reinforcement elements, which are parallel to each other within each layer and are crossed from one layer to the next, forming angles of between 10° and 45° with the circumferential direction. Said working layers, which form the working reinforcement, may also be covered by at least one so-called protective layer, formed of advantageously metallic, extensible reinforcement elements, which are referred to as "elastic elements".

In the case of tires for "heavy vehicles", a single protective layer is usually present and its protective elements, in the majority of cases, are oriented in the same direction and at the same angle in absolute value as those of the reinforcement elements of the working layer which is radially outermost and therefore radially adjacent. In the case of construction-vehicle tires which are intended to travel on relatively bumpy roads, it is advantageous for two protective layers to be present, the reinforcement elements being crossed from one layer to the next and the reinforcement elements of the radially inner protective layer being crossed with the inextensible reinforcement elements of the radially outer working layer adjacent to said radially inner protective layer.

Cables are said to be inextensible when said cables have a relative elongation at most equal to 0.2% under a tensile force equal to 10% of the breaking load.

Cables are said to be elastic when said cables have a relative elongation at least equal to 4% under a tensile force equal to the breaking load.

The circumferential direction of the tire, or longitudinal direction, is the direction corresponding to the periphery of the tire and defined by the direction of rolling of the tire.

The transverse or axial direction of the tire is parallel to the axis of rotation of the tire.

The radial direction is a direction intersecting and perpendicular to the axis of rotation of the tire.

The axis of rotation of the tire is the axis around which it rotates in normal use.

A radial or meridian plane is a plane containing the axis of rotation of the tire.

The circumferential median plane, or equatorial plane, is a plane which is perpendicular to the axis of rotation of the tire and divides the tire into two halves.

Certain current tires, referred to as "highway" tires, are intended to travel at high speed and on increasingly long journeys, owing to the improvement in road networks and the growth in motorway networks throughout the world. All the conditions under which such a tire is required to travel without doubt make it possible to increase the number of kilometers traveled, the wear of the tire being less; on the other hand, the endurance of the latter, and in particular of the crown reinforcement, is impaired.

There are in fact stresses at the level of the crown reinforcement and more particularly shearing stresses between the crown layers, allied to a not insignificant increase in the operating temperature at the level of the ends of the axially shortest crown layer, the consequence of which is the appearance and propagation of cracks in the rubber at said ends.

In order to improve the endurance of the crown reinforcement of the type of tire in question, solutions relating to the structure and quality of the layers and/or profiled elements of rubber mixes which are arranged between and/or around the ends of plies, and more particularly the ends of the axially shortest ply, have already been provided.

French Patent FR1 389 428, in order to improve the resistance to degradation of the rubber mixes located in the vicinity of the edges of the crown reinforcement, advocates the use, in combination with a tread of low hysteresis, of a rubber profiled element covering at least the sides and the marginal edges of the crown reinforcement and formed of a rubber mix of low hysteresis.

French Patent FR 2 222 232, in order to avoid separations between crown reinforcement plies, teaches coating the ends of the reinforcement with a pad of rubber, the Shore A hardness of which differs from that of the tread surmounting said reinforcement, and is greater than the Shore A hardness of the profiled element of rubber mix arranged between the edges of crown reinforcement plies and the carcass reinforcement.

French application FR 2 728 510 proposes arranging, firstly between the carcass reinforcement and the crown reinforcement working ply radially closest to the axis of rotation, an axially continuous ply, formed of inextensible metal cables forming with the circumferential direction an angle at least equal to 60°, and the axial width of which is at least equal to the axial width of the shortest working crown ply, and secondly between the two working crown plies an additional ply formed of metallic elements, which are oriented substantially parallel to the circumferential direction.

Prolonged travel of the tires thus constructed caused fatigue failure to appear in the cables of the additional ply and more particularly the edges of said ply, whether the so-called triangulation ply is present or not.

In order to overcome such drawbacks and improve the endurance of the crown reinforcement of these tires, International application WO 99/24269 proposes, on either side of the equatorial plane and in the immediate axial extension of the additional ply of reinforcement elements which are substantially parallel to the circumferential direction, to couple, over a certain axial distance, the two working crown plies formed of reinforcement elements crossed from one ply to the next, then to decouple them by means of profiled elements of rubber mix at least over the remainder of the width common to said two working plies.

SUMMARY OF THE INVENTION

One aim of the invention is to provide tires for "heavy vehicles", the endurance performance of which is improved still further compared with conventional tires.

This object is achieved according to an aspect of the invention by a tire having a radial carcass reinforcement comprising a crown reinforcement formed of at least two working crown layers of inextensible reinforcement elements, which are crossed from one ply to the other, forming angles of between 10° and 45° with the circumferential direction, which itself is topped radially by a tread, said tread being joined to two beads by means of two sidewalls, the tire additionally comprising in each shoulder at least one layer of reinforcement elements which are oriented circumferentially and have an undulation, the axially inner end of said additional layer being radially adjacent to the edge of a working crown layer, at least part of said additional layer being radially and/or axially adjacent to the edge of the axially widest working crown layer, a layer P of cohesive rubber mixes being arranged between at least part of the working crown layers, the axially outer end of the layer P being axially between the ends of the axially least wide and widest working crown layers, the ratio of the elasticity modulus of the layer P to the elasticity modulus of the calendering layer of the working layer adjacent to the additional layer being of between 0.5 and 1.

The calendering layer in question is the layer of rubber which separates the reinforcement elements of the working layer from the layer P.

"Elasticity modulus" of a rubber mix is understood to mean a secant modulus of extension at 10% deformation and at ambient temperature.

The measurements of modulus are carried out under tension in accordance with Standard AFNOR-NFT-46002 of September 1988: the nominal secant modulus (or apparent stress, in MPa) at 10% elongation is measured in a second elongation (i.e. after an accommodation cycle) (normal conditions of temperature and relative humidity in accordance with Standard AFNOR-NFT-40101 of December 1979).

According to a preferred embodiment of the invention, the reinforcement elements of the additional layer exhibit an undulation of wavelength λ of between 10 and 50 mm.

Preferably also, the reinforcement elements of the additional layer exhibit an undulation of amplitude a of between 2 and 10 mm.

One advantageous embodiment of the invention provides for the axially inner end of said additional layer to be radially adjacent to the edge of the radially outer working crown layer.

Advantageously also, the axially inner end of said additional layer is radially external to the edge of the radially outer working crown layer.

Reinforcement elements which are oriented circumferentially and have an undulation are reinforcement elements which exhibit a main orientation forming angles within the range +2.5°, −2.5° around 0° with the circumferential direction, and which undulate around this main orientation.

The axial widths of the layers of reinforcement elements or axial positions of the ends of said layers are measured on a cross-section of a tire, the tire therefore being in a non-inflated state.

Tests carried out with tires thus defined according to the invention have shown that the performance in terms of endurance of the tire is improved compared with tires of more traditional design which do not comprise the additional layers combined with the presence of a layer P such as described according to the invention. One interpretation of these results may be to note that the additional layer, and more precisely the reinforcement elements of the additional layer, makes it possible both to reduce the appearance of cracks and to limit the propagation of any such initial cracks at the end of the working layer to which it is adjacent. Such an action may possibly be on one hand linked to local absorption of forces, initially supported by the working layers, by the additional layer owing to its main orientation in a circumferential direction and on the other hand the consequence of reinforcement of the calendering rubber compounds between the reinforcement elements of said working layer by the reinforcement elements of the additional layer owing to the undulation of said reinforcement elements of the additional layer. It would furthermore seem that these effects of the additional layers are promoted by the presence of the layer P according to the invention, which brings about decoupling of the working crown layers, also contributing per se to improving the endurance of the tire.

"Coupled plies" are to be understood to mean plies, the respective reinforcement elements of which are separated radially by at most 1.5 mm, said thickness of rubber being measured radially between the upper and lower generatrices respectively of said reinforcement elements.

According to an embodiment of the invention, the ratio of the elasticity moduli provided contributes to obtaining decoupling of the working layers with lesser heat dissipation and therefore lesser heating in this zone of the tire.

The layer P according to the invention is sized such that coupling may occur between the additional layer and the edge of the axially widest working crown layer. The invention thus advantageously provides for the axially outer end of the layer P to be located at a distance from the equatorial plane of the tire which is less than or equal to the distance between said plane and the end of the axially widest working crown layer.

Preferably also, the axial width D of the layer P between the axially inner end of said layer P and the end of the axially least wide working crown ply is such that:

$$3 \cdot \phi_2 \leq D \leq 20 \cdot \phi_2$$

where $\phi_2$ is the diameter of the reinforcement elements of the axially least wide working crown ply. Such a relationship defines a zone of engagement between the layer P of rubber mixes and the axially least wide working ply. Such an engagement below a value equal to three times the diameter of the reinforcement elements of the radially outer working ply may not be sufficient to achieve decoupling of the working plies to obtain in particular attenuation of the stresses at the end of the axially least wide working ply. A value of this engagement greater than twenty times the diameter of the reinforcement elements of the axially least wide working ply may result in an excessive reduction in the skid rigidity of the crown reinforcement of the tire.

Preferably, the axial width D of the layer of cohesive rubber mix P between the axially inner end of said layer of cohesive rubber mix P and the axially outer end of the axially least wide working crown layer is greater than 5 mm.

The invention also preferably provides for the layer P, at the axially outer end of the axially least wide working crown ply, to have a thickness such that the radial distance d between the two working crown plies, separated by said layer P, satisfies the relationship:

$$\tfrac{3}{5} \cdot \phi_2 < d < 5 \cdot \phi_2$$

where $\phi_2$ is the diameter of the reinforcement elements of the axially least wide working crown ply.

The distance d is measured from cable to cable, that is to say between the cable of a first working ply and the cable of a second working ply. In other words, this distance d covers the thickness of the layer P and the respective thicknesses of the calendering rubber mixes, which is radially external to the cables of the radially inner working ply and radially internal to the cables of the radially outer working ply.

The different measurements of thickness are carried out on a cross-section of a tire, the tire therefore being in a non-inflated state.

According to one advantageous embodiment of the invention, the axially widest working crown layer is radially internal to the other working crown layers.

According to one preferred embodiment of the invention, the difference between the axial width of the axially widest working crown layer and the axial width of the axially least wide working crown layer is between 5 and 30 mm.

According to one advantageous variant embodiment of the invention, the angle formed with the circumferential direction by the reinforcement elements of the working crown layers is less than 30° and preferably less than 25°.

According to one variant embodiment of the invention, the working crown layers comprise reinforcement elements, crossed from one ply to the other, forming angles which are variable in the axial direction with the circumferential direction, said angles being greater on the axially outer edges of the layers of reinforcement elements compared with the angles of said elements measured at the level of the circumferential median plane. Such an embodiment of the invention makes it possible to increase the circumferential rigidity in some zones and on the contrary to reduce it in others, in particular in order to reduce the compressions of the carcass reinforcement.

One preferred embodiment of the invention also provides for the crown reinforcement to be finished off radially to the outside by at least one supplementary layer, referred to as a protective layer, of what are called elastic reinforcement elements, which are oriented relative to the circumferential direction at an angle of between 10° and 45° and of the same direction as the angle formed by the inextensible elements of the working layer which is radially adjacent thereto.

The protective layer may have an axial width less than the axial width of the least wide working layer. Said protective layer may also have an axial width greater than the axial width of the least wide working layer, such that it covers the edges of the least wide working layer. The protective layer formed of elastic reinforcement elements may, in the latter case mentioned above, be on one hand possibly decoupled from the edges of said least wide working layer by profiled elements, and have on the other hand an axial width less than or greater than the axial width of the widest crown layer.

When the protective layer is axially narrower than the radially outer working crown layer, the invention advantageously provides for the edge of the protective layer to be radially adjacent and preferably radially external to at least the axially inner edge of the additional layer.

In comparison with the preceding variants of the invention, in order to obtain such an embodiment of the invention, in which the edge of the protective layer is radially adjacent and external to the additional layer, either the end of the protective layer is axially more to the outside, or the axially inner end of the additional layer is axially more to the inside. In other words, either the protective layer is axially wider, or the additional layer is axially wider, being extended axially towards the inside.

According to any one of the embodiments of the invention mentioned previously, the crown reinforcement may also be finished off, for example radially between the carcass reinforcement and the radially innermost working layer, by a triangulation layer formed of inextensible reinforcement elements forming, with the circumferential direction, an angle greater than 40° and preferably of the same direction as that of the angle formed by the reinforcement elements of the layer radially closest to the carcass reinforcement.

According to a first variant embodiment of the invention, the reinforcement elements of the additional layer are metallic reinforcement elements.

According to another variant embodiment of the invention, the reinforcement elements of the additional layer are textile reinforcement elements.

One advantageous embodiment of the invention provides for the crown reinforcement of the tire furthermore to comprise at least one continuous layer of circumferential reinforcement elements the axial width of which is preferably less than the axial width of the axially widest working crown layer.

The axial widths of the continuous layers of reinforcement elements are measured on a cross-section of a tire, the tire being in a non-inflated state.

The presence in the tire according to the invention of at least one continuous layer of circumferential reinforcement elements may make it possible to contribute to obtaining virtually infinite radii of axial curvature of the different reinforcement layers in a zone centered on the circumferential median plane, which contributes to the endurance performance of the tire.

According to one advantageous embodiment of the invention, the reinforcement elements of at least one continuous layer of circumferential reinforcement elements are metallic reinforcement elements having a secant modulus at 0.7% elongation of between 10 and 120 GPa and a maximum tangent modulus of less than 150 GPa.

According to a preferred embodiment, the secant modulus of the reinforcement elements at 0.7% elongation is less than 100 GPa and greater than 20 GPa, preferably between 30 and 90 GPa and more preferably still less than 80 GPa.

Preferably also, the maximum tangent modulus of the reinforcement elements is less than 130 GPa and more preferably still less than 120 GPa.

The moduli expressed above are measured on a curve of tensile stress as a function of the elongation determined with a prestress of 20 MPa referred to the metal section of the reinforcement element, the tensile stress corresponding to a measured tension referred to the metal section of the reinforcement element.

The moduli of the same reinforcement elements may be measured on a curve of tensile stress as a function of the elongation determined with a prestress of 10 MPa referred to the overall section of the reinforcement element, the tensile stress corresponding to a measured tension referred to the overall section of the reinforcement element. The overall section of the reinforcement element is the section of a composite element formed of metal and of rubber, the latter having in particular penetrated the reinforcement element during the phase of curing the tire.

According to this formulation relative to the overall section of the reinforcement element, the reinforcement elements of at least one layer of circumferential reinforcement elements are metallic reinforcement elements having a secant modulus at 0.7% elongation of between 5 and 60 GPa and a maximum tangent modulus of less than 75 GPa.

According to a preferred embodiment, the secant modulus of the reinforcement elements at 0.7% elongation is less than 50 GPa and greater than 10 GPa, preferably between 15 and 45 GPa and more preferably still less than 40 GPa.

Preferably also, the maximum tangent modulus of the reinforcement elements is less than 65 GPa and more preferably still less than 60 GPa.

According to one preferred embodiment, the reinforcement elements of at least one continuous layer of circumferential reinforcement elements are metallic reinforcement elements having a curve of tensile stress as a function of the relative elongation having shallow gradients for the low elongations and a substantially constant, steep gradient for the higher elongations. Such reinforcement elements of the continuous layer of circumferential reinforcement elements are usually referred to as "bimodular" elements.

According to a preferred embodiment of the invention, the substantially constant, steep gradient appears from a relative elongation of between 0.1% and 0.5% onwards.

The different characteristics of the reinforcement elements mentioned above are measured on reinforcement elements taken from tires.

Reinforcement elements which are more particularly suitable for producing at least one continuous layer of circumferential reinforcement elements according to the invention are for example assemblies of formula 21.23, the construction of which is 3×(0.26+6×0.23) 4.4/6.6 SS; this stranded cable is formed of 21 elementary cords of formula 3×(1+6), with 3 strands twisted together each formed of 7 cords, one cord forming a central core of a diameter of $^{26}/_{100}$ mm and 6 wound cords of a diameter of $^{23}/_{100}$ mm. Such a cable has a secant modulus at 0.7% of 45 GPa and a maximum tangent modulus of 98 GPa, both measured on a curve of tensile stress as a function of the elongation determined with a prestress of 20 MPa referred to the metal section of the reinforcement element, the tensile stress corresponding to a measured tension referred to the metal section of the reinforcement element. On a curve of tensile stress as a function of the elongation determined with a prestress of 10 MPa referred to the overall section of the reinforcement element, the tensile stress corresponding to a measured tension referred to the overall section of the reinforcement element, this cable of formula 21.23 has a secant modulus at 0.7% of 23 GPa and a maximum tangent modulus of 49 GPa.

In the same manner, another example of reinforcement elements is an assembly of formula 21.28, the construction of which is 3×(0.32+6×0.28) 6.2/9.3 SS. This cable has a secant modulus at 0.7% of 56 GPa and a maximum tangent modulus of 102 GPa, both measured on a curve of tensile stress as a function of the elongation determined with a prestress of 20 MPa referred to the metal section of the reinforcement element, the tensile stress corresponding to a measured tension referred to the metal section of the reinforcement element. On a curve of tensile stress as a function of the elongation determined with a prestress of 10 MPa referred to the overall section of the reinforcement element, the tensile stress corresponding to a measured tension referred to the overall section of the reinforcement element, this cable of formula 21.28 has a secant modulus at 0.7% of 27 GPa and a maximum tangent modulus of 49 GPa.

The use of such reinforcement elements in at least one continuous layer of circumferential reinforcement elements makes it possible in particular to retain satisfactory rigidities of the layer including after the stages of shaping and of curing in conventional manufacturing processes.

According to a second embodiment of the invention, the circumferential reinforcement elements of a continuous layer may be formed of inextensible metallic elements cut so as to form sections of a length very much less than the circumference of the least long layer, but preferably greater than 0.1 times said circumference, the cuts between sections being axially offset from each other. Preferably also, the modulus of elasticity in tension per unit of width of the continuous layer of circumferential reinforcement elements is less than the modulus of elasticity in tension, measured under the same conditions, of the most extensible working crown layer. Such an embodiment makes it possible to impart to the continuous layer of circumferential reinforcement elements, in simple manner, a modulus which can easily be adjusted (by selecting the intervals between sections of one and the same row), but which is in all cases lower than the modulus of the layer formed of the same metallic, but continuous, elements, the modulus of the continuous layer of circumferential reinforcement elements being measured on a vulcanized layer of cut elements which is taken from the tire.

According to a third embodiment of the invention, the circumferential reinforcement elements of a continuous layer are undulating metallic elements, the ratio $a/\lambda$ of the amplitude of undulation to the wavelength being at most equal to 0.09. Preferably, the modulus of elasticity in tension per unit of width of the continuous layer of circumferential reinforcement elements is less than the modulus of elasticity in tension, measured under the same conditions, of the most extensible working crown layer.

The metallic elements are preferably steel cables.

According to one variant embodiment of the invention, at least one continuous layer of circumferential reinforcement elements is arranged radially between two working crown layers.

According to the latter variant embodiment, the continuous layer of circumferential reinforcement elements makes it possible to limit more significantly the compression of the reinforcement elements of the carcass reinforcement than a similar layer positioned radially to the outside of the other working crown layers. It is preferably radially separated from the carcass reinforcement by at least one working layer so as to limit the stresses on said reinforcement elements and not to fatigue them excessively.

Advantageously also in the case of a continuous layer of circumferential reinforcement elements which is arranged radially between two working crown layers, the axial widths of the working crown layers radially adjacent to the layer of circumferential reinforcement elements are greater than the axial width of said layer of circumferential reinforcement elements.

DETAILED DESCRIPTION OF THE DRAWINGS

The figures are not shown to scale in order to simplify understanding thereof. The figures show only a half-view of a tire which is extended symmetrically relative to the axis XX' which represents the circumferential median plane, or equatorial plane, of a tire.

Figure 1:
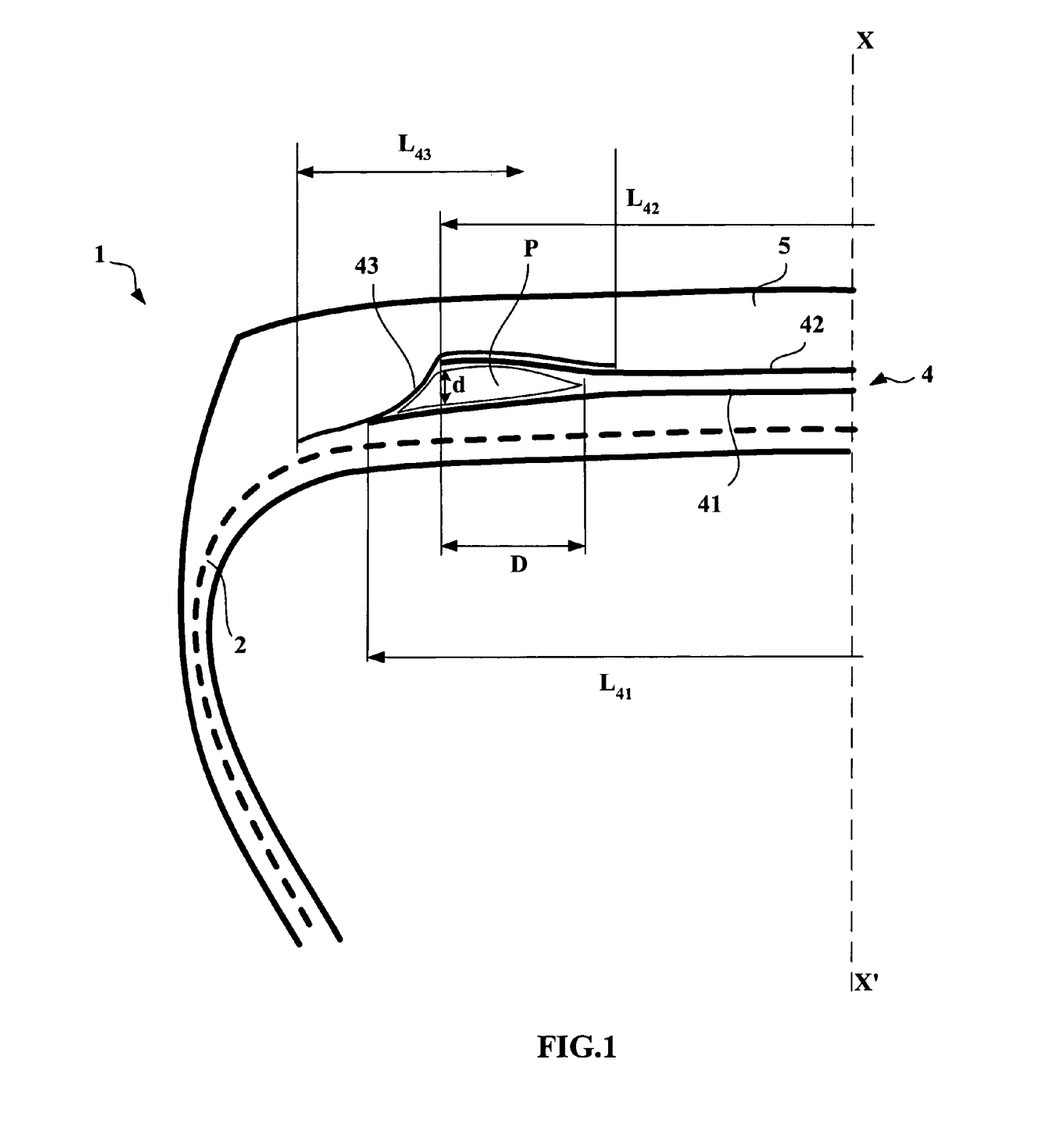
FIG. 1: a meridian view of a diagram of a tire according to one embodiment of the invention.

In FIG. 1, the tire 1, of dimension 315/80 R 22.5×, has a form ratio H/S of 0.80, H being the height of the tire 1 on its mounting rim and S its maximum axial width. Said tire 1 comprises a radial carcass reinforcement 2 anchored in two beads, which are not shown in the figure. The carcass reinforcement is formed of a single layer of metal cables. This carcass reinforcement 2 is wrapped by a crown reinforcement 4, formed radially from the inside to the outside:

of a first working layer 41 formed of non-wrapped, inextensible metal 11.35 cables which are continuous over the entire width of the ply and oriented at an angle of 18°, of a second working layer 42 formed of non-wrapped, inextensible metal 11.35 cables which are continuous over the entire width of the ply and oriented at an angle of 18° and crossed with the metal cables of the layer 41; the layer 42 is axially smaller than the layer 41, of an additional layer 43 formed of cables which are oriented circumferentially and have an undulation of wavelength λ of 40 mm and of peak-to-peak amplitude a of 8 mm; the layer 43 is radially external and adjacent to the radially outer working layer 42 and extends as far as the layer 41 to be coupled therewith. The layer 43 then extends axially beyond the axially outer end of the layer 41. Tests were carried out on one hand with 4.23 metal cables and on the other hand with PET 144×2 textile cables.

The axial width $L_{41}$ of the first working layer 41 is 226 mm.

The axial width $L_{42}$ of the second working layer 42 is 206 mm.

The additional layer 43 has a width of 75 mm; it has a zone of axial overlap with the layer 42 of 53 mm and a zone of overlap with the layer 41 of 3 mm.

The crown reinforcement is itself topped by a tread 5.

A rubber layer P, radially between and in contact with the working crown layers 41 and 42, referred to as a decoupling rubber, covers the end of said working layer 42 and extends such that its axially outer end is at a distance from the circumferential median plane which is less than half the axial width of the layer 41. The layer P of rubber mix thus provides decoupling between the working layer 41 and the end of the radially outer working layer 42. The zone of engagement of the layer P between the two working layers 41 and 42 is defined by its thickness or more precisely the radial distance d between the end of the layer 42 and the layer 41 and by its axial width D between the axially inner end of said layer P and the end of the radially outer working crown layer. The radial distance d is equal to 3.5 mm. The axial distance D is equal to 20 mm, or approximately 13.3 times the diameter $\phi_2$ of the reinforcement elements of the working ply 42, the diameter $\phi_2$ being equal to 1.5 mm.

The elasticity moduli of the layer P and of the calendering layer of the layer 42 are identical and equal to 10 MPa; the ratio of said moduli is therefore equal to 1.

Figure 2:
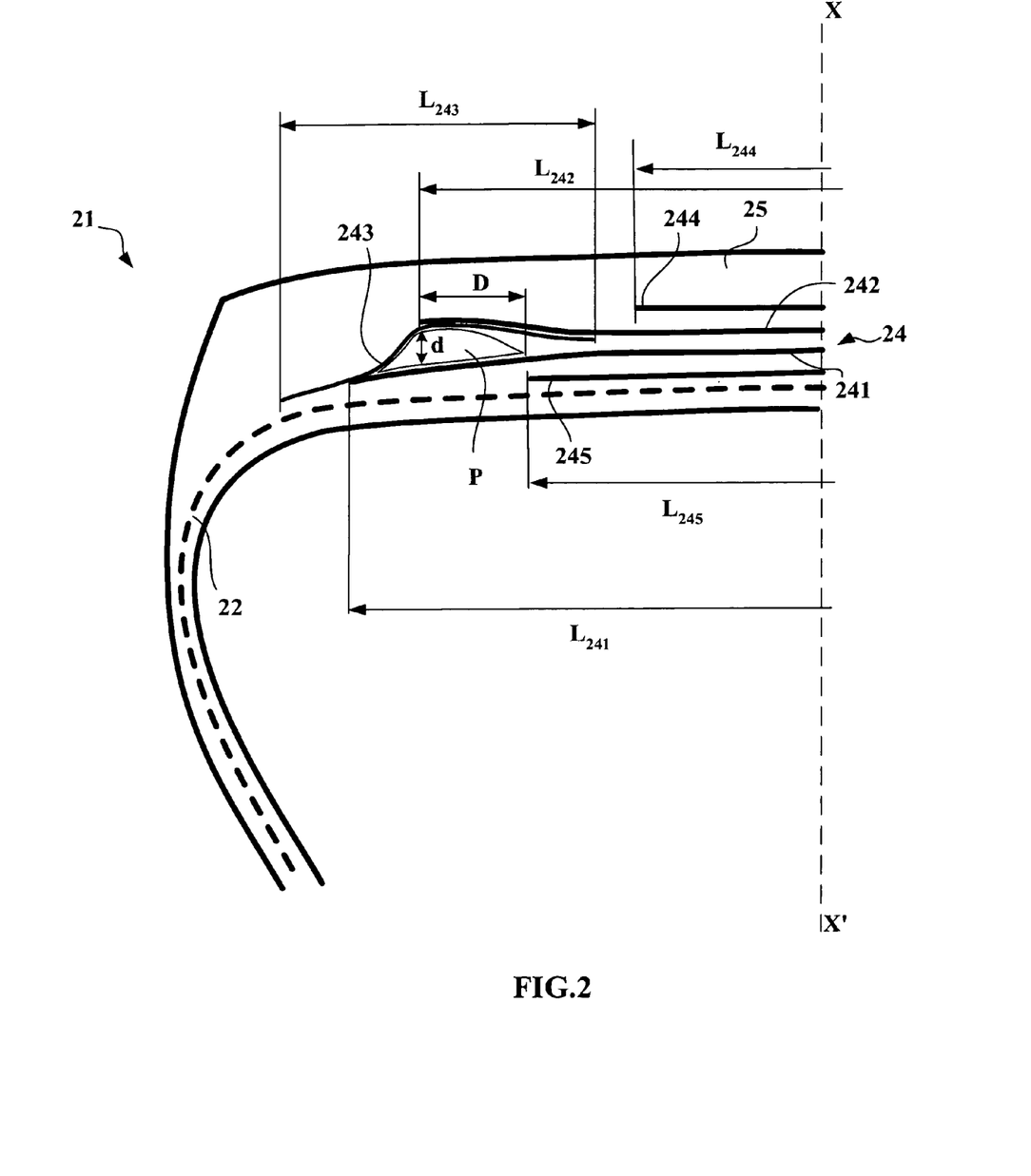
FIG. 2: a meridian view of a diagram of a tire according to a second embodiment of the invention.

In FIG. 2, the tire 21 differs from the one shown in FIG. 1 firstly in that it furthermore comprises:
- a protective layer 244 formed of elastic metal 18×23 cables, the axial width of which is equal to 86 mm.
- a supplementary layer of reinforcement elements 245, referred to as a triangulation layer, of a width substantially equal to 200 mm and formed of inextensible metal 9×28 cables. The reinforcement elements of this layer 245 form an angle of approximately 45° with the circumferential direction and are oriented in the same direction as the reinforcement elements of the working layer 241. This layer 245 makes it possible in particular to contribute to absorbing the transverse compressive stresses to which all the reinforcement elements in the zone of the crown of the tire are subject.

Secondly, the tire 21 differs from the one shown in FIG. 1 in that the layer 243 is radially adjacent to the layer 342 but radially internal thereto.

Figure 3:
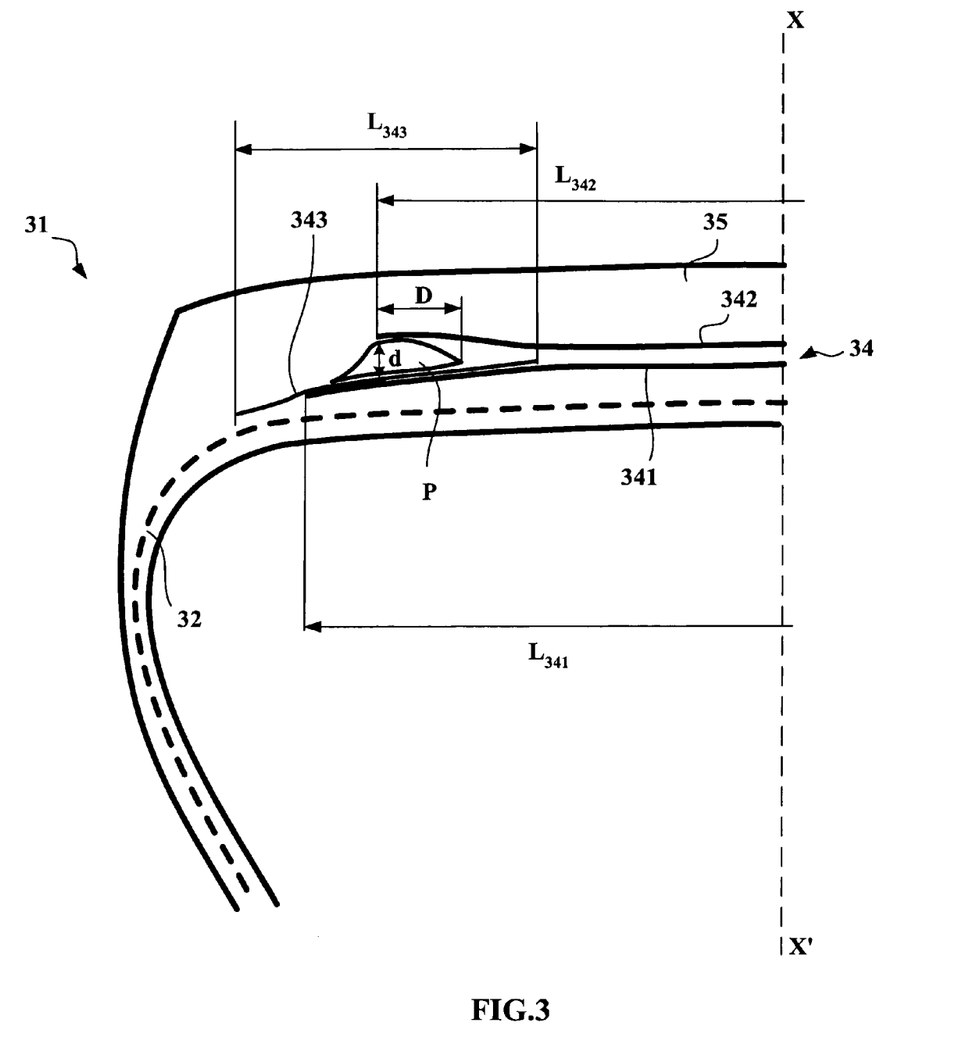
FIG. 3: a meridian view of a diagram of a tire according to a third embodiment of the invention.

In FIG. 3, the tire 31 differs from the one shown in FIG. 1 in that it comprises an additional layer 343 which is inserted between the two working layers 341, 342. The layer 343 is in fact radially adjacent and external to the layer 341; according to this embodiment of the invention, the additional layer is solely in contact with the working crown layer 341. According to other embodiments according to the invention which are not shown in the figures, the additional layer 343 may also be radially adjacent and internal to the working layer 341.

Figure 4:
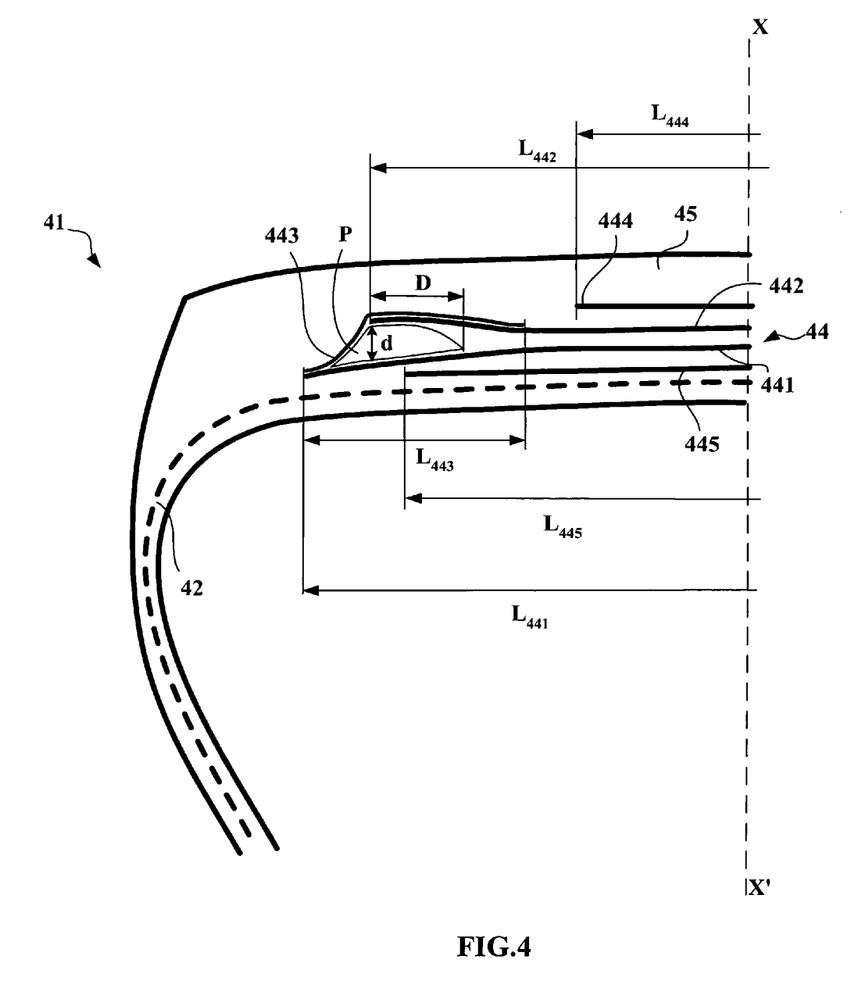
FIG. 4: a meridian view of a diagram of a tire according to a fourth embodiment of the invention.

In FIG. 4, the tire 41 differs from the one shown in FIG. 1 firstly in that it comprises a protective 444 and a triangulation 445 layer and in that it comprises an additional layer 443, the axially outer end of which is in a position identical to that of the end of the layer 441. The layer 443 has a width $L_{343}$ of 65 mm. According to other embodiments according to the invention which are not shown in the figures, the additional layer 443 may also have an axially outer end in a position axially internal to the end of the layer 441.

Figure 5:
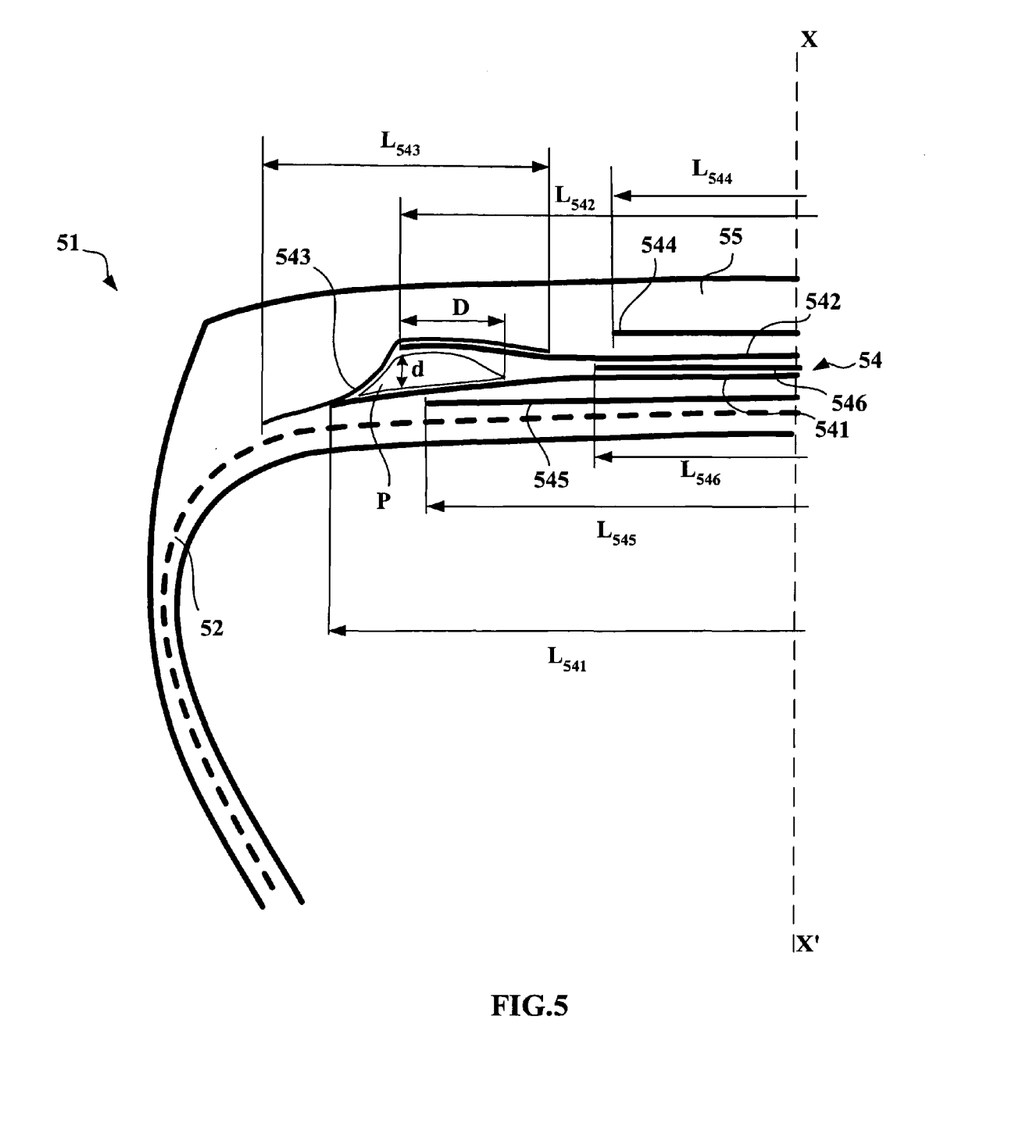
FIG. 5: a meridian view of a diagram of a tire according to a fifth embodiment of the invention.

FIG. 5 illustrates a variant embodiment of a tire 51 in accordance with the invention which, compared with the embodiment of FIG. 2, furthermore comprises a continuous layer 546 of circumferential reinforcement elements which is inserted between the working layers 541 and 542. This continuous layer 546 has a width $L_{546}$ of 185 mm, less than the widths of the working layers 541 and 542.

Figure 6:
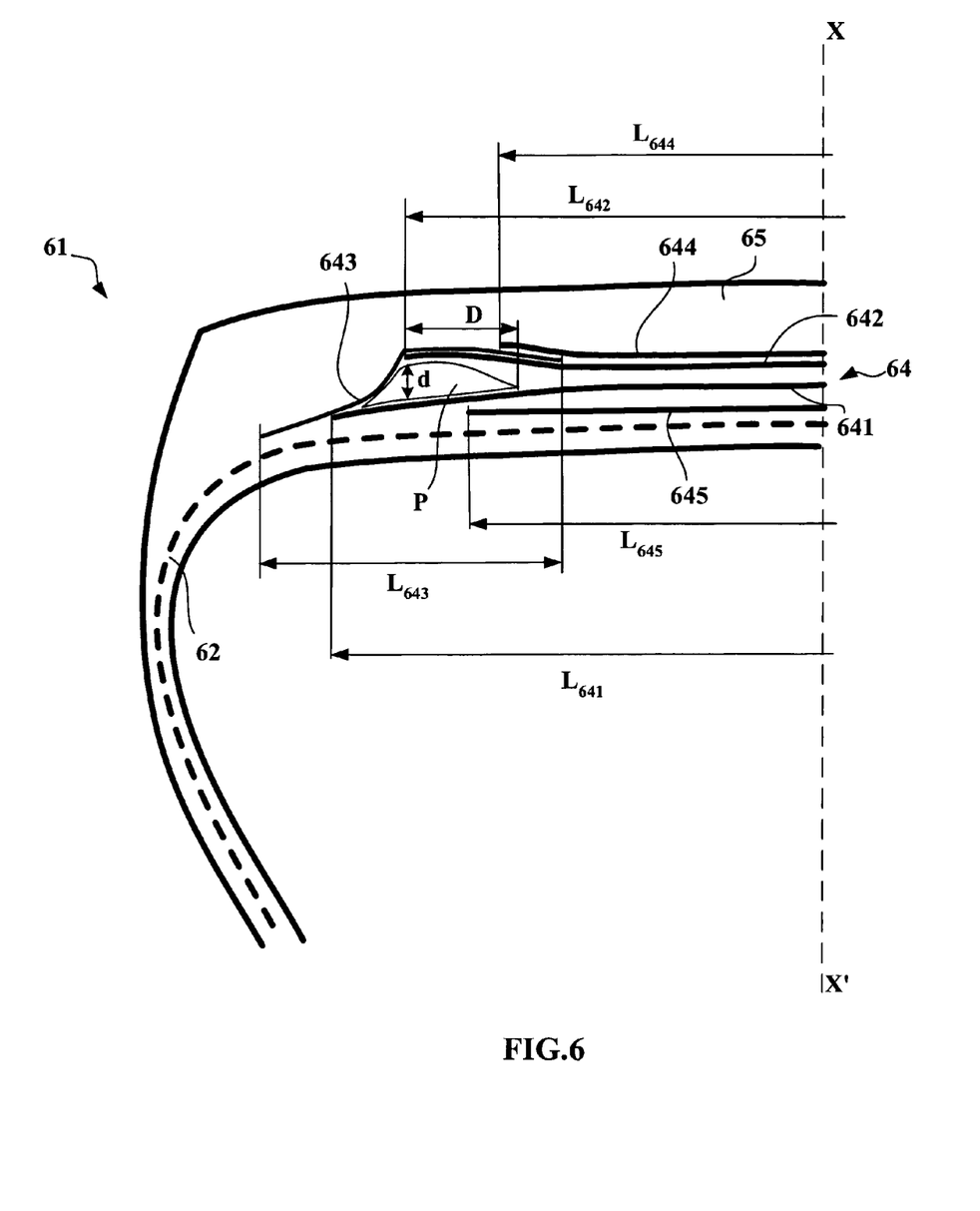
FIG. 6: a meridian view of a diagram of a tire according to a sixth embodiment of the invention.

FIG. 6 illustrates yet another variant embodiment of a tire 61 according to the invention which, compared with the embodiment of FIG. 2, has a protective layer 644 radially adjacent and external to the additional layer 643. According to this embodiment, the axially inner end of the additional layer 643 is thus radially between the working layer 642 and the protective layer 644 over an axial width of 10 mm.

In FIG. 6, the protective layer has been widened relative to those of the other figures comprising such a protective layer; a similar result not shown in the figures may be obtained with a wider additional layer, the axially inner end of which is more to the inside in order to obtain an overlap with a protective layer which is axially narrower than that of FIG. 6.

Tests were carried out with the tire produced according to the invention in accordance with the illustration of FIG. 4, and were compared with a reference tire which is identical but produced using a conventional configuration. The tests were carried out on one hand with metallic reinforcement elements of the additional layer of type 4.23 and on the other hand with textile reinforcement elements of type PET 144×2.

The conventional tire does not comprise the additional layers 43. On the other hand, they comprise protective and triangulation layers.

The first endurance tests were carried out by fitting identical vehicles with each of the tires and making each of the vehicles follow straight-line paths, the tires being subjected to loads greater than the rated load in order to speed up this type of test.

The reference vehicle comprising the conventional tires is associated with a load per tire of 3600 kg at the start of travel and changes to reach a load of 4350 kg at the end of travel.

The vehicle comprising the tires according to the invention is associated with a load per tire of 3800 kg at the start of travel and changes to reach a load of 4800 kg at the end of travel.

The tests are stopped when the tire is damaged and/or no longer functions normally.

The tests thus carried out showed that the vehicles fitted with tires according to the invention with the metallic reinforcement elements or with the textile reinforcement elements covered distances greater than or equal to the distance traveled by the reference vehicles.

Other endurance tests were carried out on a test machine, alternating sequences of turning to the left, turning to the right then traveling in a straight line under load conditions varying from 60 to 200% of the rated load and thrust conditions varying from 0 to 0.35 times the applied load. The speed is of between 30 and 70 km/h. The tests are stopped when the tire is damaged and/or no longer functions normally.

The results obtained show gains in terms of distances traveled by the tires according to the invention with the metallic reinforcement elements and with the textile reinforcement elements, these being greater than the distance traveled by the reference tires.

The invention claimed is:

1. A heavy-load vehicle tire configured to be operable on a heavy-load vehicle and having a radial carcass reinforcement comprising:
   a crown reinforcement formed of at least two working crown layers of inextensible reinforcement elements, which are crossed from one ply to the other, forming angles of between 10° and 45° with a circumferential direction of the tire, and topped radially by a tread, said tread being joined to two beads by means of two sidewalk; and
   in each shoulder, at least one additional layer of reinforcement elements which are oriented circumferentially and have an undulation;
   wherein an axially inner end of said additional layer is radially adjacent to an edge of one of the working crown layers;
   wherein at least part of said additional layer is at least one of radially and axially coupled to an edge of an axially widest working crown layer;
   wherein a layer P of cohesive rubber mixes is arranged between at least part of the working crown layers;
   wherein an axially outer end of the layer P is axially between ends of axially least wide and widest working crown layers;
   wherein a ratio of an elasticity modulus of the layer P to an elasticity modulus of a calendering layer of a working crown layer adjacent to the additional layer is of between 0.5 and 1;

wherein the crown reinforcement comprises at least one continuous layer of circumferential reinforcement elements; and wherein the at least one continuous layer of circumferential reinforcement elements is arranged radially between two working crown layers.

2. The tire according to claim 1, wherein the reinforcement elements of the additional layer exhibit an undulation of wavelength $\lambda$ of between 10 and 50 mm.

3. The tire according to claim 1, wherein the reinforcement elements of the additional layer exhibit an undulation of amplitude a of between 2 and 10 mm.

4. The tire according to claim 1, wherein the axially inner end of said additional layer is radially adjacent to the edge of the radially outer working crown layer.

5. The tire according to claim 4, wherein the axially inner end of said additional layer is radially external to the edge of the radially outer working crown layer.

6. The tire according to claim 1, wherein the axial width D of the layer P between the axially inner end of said layer P and the end of the axially least wide working crown ply is such that:

$$3 \cdot \phi_2 \leq D \leq 20 \cdot \phi_2$$

where $\phi_2$ is the diameter of the reinforcement elements of the radially outer working crown ply.

7. The tire according to claim 1, wherein the axial width D of the layer of cohesive rubber mix P between the axially inner end of said layer of cohesive rubber mix P and the axially outer end of the axially least wide working crown layer is greater than 5 mm.

8. The tire according to claim 1, wherein the layer P, at the axially outer end of the axially least wide working crown ply, has a thickness such that the radial distance d between the two working crown plies, separated by said layer P, satisfies the relationship:

$$\tfrac{3}{5} \cdot \phi_2 < d < 5 \cdot \phi_2$$

where $\phi_2$ is the diameter of the reinforcement elements of the radially outer working crown ply.

9. The tire according to claim 1, wherein the axially widest working crown layer is radially internal to the other working crown layers.

10. The tire according to claim 1, wherein the difference between the axial width of the axially widest working crown layer and the axial width of the axially least wide working crown layer is between 5 and 30 mm.

11. The tire according to claim 1, wherein the angle formed with the circumferential direction by the reinforcement elements of the working crown layers is less than 30°.

12. The tire according to claim 1, wherein the working crown layers comprise reinforcement elements, crossed from one ply to the other, forming angles which are variable in the axial direction with the circumferential direction.

13. The tire according to claim 1, wherein the crown reinforcement is finished off radially to the outside by at least one supplementary ply, referred to as a protective ply, of what are called elastic reinforcement elements, which are oriented relative to the circumferential direction at an angle of between 10° and 45° and of the same direction as the angle formed by the inextensible elements of the working ply which is radially adjacent thereto.

14. The tire according to claim 1, wherein the crown reinforcement comprises a triangulation layer formed of metallic reinforcement elements forming angles greater than 40° with the circumferential direction.

15. The tire according to claim 1, wherein the reinforcement elements of said additional layer are metallic reinforcement elements.

16. The tire according to claim 1, wherein the reinforcement elements of said additional layer are textile reinforcement elements.

17. The tire according to claim 1, wherein the axial width of the at least one continuous layer of circumferential reinforcement elements is less than the axial width of the axially widest working crown layer.

18. The tire according to claim 1, wherein the axial widths of the working crown layers radially adjacent to the continuous layer of circumferential reinforcement elements are greater than the axial width of said continuous layer of circumferential reinforcement elements.

19. The tire according to claim 1, wherein the reinforcement elements of the at least one continuous layer of circumferential reinforcement elements are metallic reinforcement elements having a secant modulus at 0.7% elongation of between 10 and 120 GPa and a maximum tangent modulus of less than 150 GPa.

20. The tire according to claim 19, wherein the secant modulus of the reinforcement elements at 0.7% elongation is less than 100 GPa, and greater than 20 GPa.

21. The tire according to claim 19, wherein the maximum tangent modulus of the reinforcement elements is less than 130 GPa.

22. The tire according to claim 19, wherein the secant modulus of the reinforcement elements at 0.7% elongation is between 30 and 90 GPa.

23. The tire according to claim 19, wherein the maximum tangent modulus of the reinforcement elements is less than 120 GPa.

24. The tire according to claim 1, wherein the reinforcement elements of the at least one continuous layer of circumferential reinforcement elements are metallic reinforcement elements having a curve of tensile stress as a function of the relative elongation having shallow gradients for the low elongations and a substantially constant, steep gradient for the higher elongations.

25. The tire according to claim 1, wherein the reinforcement elements of the at least one continuous layer of circumferential reinforcement elements are metallic reinforcement elements cut so as to form sections of a length less than the circumference of the least long ply, but greater than 0.1 times said circumference, the cuts between sections being axially offset from each other, the modulus of elasticity in tension per unit of width of the continuous layer of circumferential reinforcement elements being less than the modulus of elasticity in tension, measured under the same conditions, of the most extensible working crown layer.

26. The tire according to claim 1, wherein the reinforcement elements of at least one continuous layer of circumferential reinforcement elements are undulating metallic reinforcement elements, the ratio $a/\lambda$ of the amplitude of undulation a to the wavelength $\lambda$ being at most equal to 0.09, the modulus of elasticity in tension per unit of width of the continuous layer of circumferential reinforcement elements being less than the modulus of elasticity in tension, measured under the same conditions, of the most extensible working crown layer.

27. The tire according to claim 1, wherein the angle formed with the circumferential direction by the reinforcement elements of the working crown layers is less than 25°.

* * * * *